United States Patent Office 3,667,912
Patented June 6, 1972

3,667,912
CHEMICAL PRODUCTION OF CHLORINE
Daniel J. Jaszka, Tonawanda, N.Y., assignor to Hooker Chemical Corporation, Niagara Falls, N.Y.
No Drawing. Filed Dec. 21, 1970, Ser. No. 100,463
Int. Cl. C01b 7/02, 11/02
U.S. Cl. 23—219
12 Claims

ABSTRACT OF THE DISCLOSURE

Substantially pure chlorine is produced under reaction conditions commonly employed for chlorine dioxide production, involving reaction of a chlorate, chloride and a mineral acid, by catalyzing the reaction with hexavalent molybdenum.

BACKGROUND OF THE INVENTION

This invention relates to the production of gaseous chlorine by means of a chemical reaction and more particularly, this invention relates to a method whereby a chlorine dioxide production facility can be utilized to produce substantially pure chlorine from an alkali metal chloride and an alkali metal chlorate.

In bleaching processes, such as those utilized in the bleaching of cellulosic materials such as wood pulp, both chlorine and chlorine dioxide may be used separately or in combination as the oxidizing agent. In such plants, chlorine dioxide is normally produced as the bleaching plant site by the reduction of an alkali metal chlorate. Such plants often have facilities for the electrolytic manufacture of chlorates such as sodium chlorate or they may be supplied with bulk amounts of sodium chlorate in either dry form or in aqueous solution. Chlorine dioxide is generally produced from the alkali metal chlorate by reaction the chlorate with a reducing agent in the presence of a strong acid.

It is most desirable to have the capability for chlorine production at a bleaching plant site to meet temporary demands for chlorine in excess of the amount routinely required, without the cost of maintaining stand-by electrolytic chlorine cell capabilities. Theoretically, the chemical reaction involved in the production of chlorine dioxide:

(1) NaClO₃+NaCl+H₂SO₄→
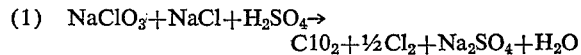

may be altered by increasing the chloride to chlorate ratio to produce more chlorine by the reactions:

(2) NaClO₃+5NaCl+3H₂SO₄→
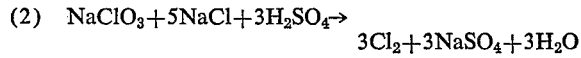

(3) NaClO₃+5HCl+½H₂SO₄→
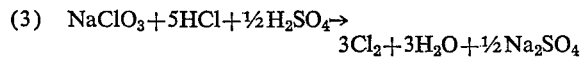

However, the performance of reaction (2) in the absence of reaction (1) has not been found to be obtainable in actual practice.

Although Equations 2 and 3 indicate that by selection of the proper chloride to chlorate ratios, only chlorine is produced, in actual practice the amount of chlorine produced is limited to a maximum of about 91 percent chlorine. This limitation upon the maximum amount of chlorine produceable under the idealized conditions presented in Equations 2 and 3 may be explained by the fact that it is not possible to suppress the performance of Equation 1 by merely changing the chloride to chlorate ratio.

Thus, in actual practice, employing concentrated hydrochloric acid (35 percent) as the acid and source of chloride ions with concentrated sodium chlorate solution, approximately 25 percent of the sodium chlorate reacts by way of Equation 1 while 75 percent goes by way of equation:

(4) ClO₃⁻+6HCl→3Cl₂+Cl⁻+3H₂O

Thus, 100 moles of sodium chlorate will react with hydrochloric acid to produce 25 moles ClO₂ and 12.5 moles of chlorine via Equation 1 and 225 moles of chlorine via Equation 4. Therefore, the weight of chlorine produced from 100 moles of sodium chlorate is 16,800 grams, the weight of chlorine dioxide produced is 1,680 grams for a total of 18,480 grams. The percent chlorine by weight in the mixture is 91 percent chlorine by weight. This maximum percent of chlorine produceable by the direct reaction of sodium chlorate with hydrochloric acid is supported by Gooch et al., "Scientific American," Supplement No. 975, September 1894, pages 15,580 and 15,581.

SUMMARY OF THE INVENTION

In accordance with this invention there is provided a process for the chemical production of substantially pure chlorine which comprises reacting an alkali metal chlorate with an alkali metal chloride in the presence of an acid selected from the group consisting of hydrochloric acid, sulfuric acid, phosphoric acid, chloric acid and perchloric acid in the presence of hexavalent molybdenum.

By substantially pure chlorine, applicant means chlorine gas of about 85–99 percent chlorine, the remaining active impurity being primarily chlorine dioxide. Depending upon the reaction conditions, the chlorine gas may be additionally diluted with air, water vapor or other inert gases.

The process of this invention produces substantially pure chlorine under reaction conditions conventionally employed in the production of chlorine dioxide, by merely introducing into the chlorine dioxide generating solution a catalytic amount of molybdic acid (H₂MoO₄). The conventional chlorine dioxide generating process is modified by the presence of hexavalent molybdenum to essentially completely suppress the operation of Equation 1 while directing the reaction through Equation 2 or 3. Thus, there is provided a process for the production of substantially pure chlorine without the requirement for electrolytic cell facilities, complex equipment or unusual reaction conditions requiring skilled engineering capabilities at a pulp mill bleaching site. The conventional chlorine dioxide generating conditions are described in U.S. Patent 2,863,722.

The conventional reaction conditions for chlorine dioxide generation need be modified for the production of substantially pure chlorine in accordance with this invention merely by introducing the hexavalent molybdenum catalyst into the reaction solution employed to generate chlorine dioxide. Thus, the reaction conditions for chlorine dioxide which generally provide a mixture of an alkali metal chlorate and an alkali metal chloride in molar ratio of about 1:1 to about 2:1 in the presence of at least one strong mineral acid selected from the group consisting of hydrochloric acid, sulfuric acid, phosphoric acid and chloric acid in aqueous solution of from about 2–12 normal acid, a temperature from 65 to 100 degrees centigrade and a pressure from 50 millimeters mercury absolute to atmospheric pressure. It is preferred to maintain the alkali metal chlorate concentration between about 0.5 to 3.0 moles per liter of reaction solution and the concentration of alkali metal chloride in excess of the chlorate concentration within the range of 0.5 to 3.5 moles per liter. The concentration of chloride may be adjusted if desired, during chlorine production to exceed the concentration of alkali metal chlorate by a factor of from 1 to as high as 100 times. When hydrochloric acid is employed as the strong mineral acid, the chloride content of the aqueous reaction solution is increased over the alkali metal chloride concentration by the concentration of acid.

The hexavalent molybdenum catalyst is assumed to appear in the acidic reaction solution in the form of molybdic acid ($H_2MoO_4$), which may be formed in situ by the introduction of molybdenum oxide ($MoO_3$) or any molybdate salt. The amount of hexavalent molybdenum employed may vary from approximately 0.01 to 10 grams per liter of reaction solution. The optimum amount of catalyst for any given system of chlorate, chloride and acid at various concentrations is readily ascertained by gas analysis of the product.

The catalytic activity of hexavalent molybdenum is especially surprising in view of the fact that molybdic acid has been disclosed in the prior art as a catalyst useful in increasing the reaction rate of sodium chlorate with starch (a reducing agent) at low acidities (U.S. 2,736,636, Example V, et seq.) and in view of the fact that hexavalent chromium suppresses the generation of chlorine and hexavalent tungsten appears to have little or no effect on chlorine dioxide generating efficiency under the same reaction conditions.

Thus the present invention provides a method whereby chlorine may be produced upon demand by markedly retarding the production of chlorine dioxide from a generator by addition of hexavalent molybdenum to the aqueous reaction solution. The production of chlorine dioxide may then be resumed when desired by removing the hexavalent molybdenum catalyst from the reaction solution. Any known method for removing molybdate ions from aqueous solution may be employed such as by precipitation or by merely ceasing the input of hexavalent molybdenum, to permit exhaustion of the catalyst by normal attrition as small portions of the catalyst are carried out of solution with any solid phase product of the reaction such as alkali metal sulfate, phosphate or chloride.

The hexavalent molybdenum is most conveniently used in the form of $MoO_3$ which may be in dry admixture with sodium chlorate and/or sodium chloride. An especially useful composition is an approximately equimolar ratio of $NaClO_3$ and $NaCl$ with from about 5 to 40 mole percent $MoO_3$ based upon the weight of $NaClO_3$. Thus, the molar ratio of $NaClO_3$ to $NaCl$ to $MoO_3$ may be about 1:1–1.1:0.5–0.40, and preferably about 1:1:0.10–0.20. Furthermore, dry mixtures of $NaClO_3$ and $MoO_3$ are readily formulated from $NaClO_3$ and $MoO_3$ in the ratio of 1:0.05–0.40 for use with reducing agents other than sodium chloride.

One application for the two component composition of matter of this invention containing sodium chlorate and molybdenum trioxide is in the production of an aqueous solution through which waste gaseous HCl may be bubbled or in which HCl will dissolve. The HCl is converted to chlorine which may then be recovered or recycled to a chlorination reaction as in the case where the waste HCl is a by-product of an organic chlorination reaction.

Thus, a specific application of the present invention involves what may be considered an improvement upon the Deacon process for oxidation of HCl to produce chlorine, whereby an alkali metal chlorate, such as sodium or potassium chlorate, is employed as the oxidant to convert waste HCl from an organic chlorination (substitution) reaction into chlorine for recycle to the chlorination reaction. Any small amount of chlorine dioxide which may be formed maybe converted to chlorine and oxygen by methods known in the art. Thus, an oftime major pollutant, waste HCl may be simply and economically converted to chlorine for re-use in organic reactions. Although chlorates other than alkali metal chlorates, such as alkaline earth metal chlorates, can be utilized in the present process, the most commonly utilized chlorates are the alkali-metal chlorates, particularly sodium chlorate. In addition, other alkali-metal chlorates, such as potassium chlorates, lithium chlorate, rubidium chlorate and cesium chlorate can be used with correspondingly good results.

The chlorides used are preferably the corresponding chlorides of the cation used for the chlorate. Thus, alkali-metal chlorides are particularly useful, of which sodium chloride is the most preferred. In addition to the use of alkali-metal chlorides of the same cation as the chlorate, mixed cations thereof can also be used with the corresponding mixed salt of the strong acid utilized being produced. Also, hydrogen chloride can be used solely as the chloride or as a partial replacement for the alkali-metal chloride.

The by-product salt produced in the reaction is the salt of the acid and cation of the chlorate and chloride used. Since the preferred cation is sodium and the preferred acid is $H_2SO_4$, the reaction will be described more particularly with respect to these reactants. However, in describing these reactants, the other reactants described herein are included.

Although the mole of chloride to chlorate can vary substantially, the concentration of chloride in the reaction solution is preferably limited by the solubility of the chloride in the reaction solution at the temperature of the reaction. It is preferred that the solution not become supersaturated with respect to the chloride so that the alkali-metal salt of the chloride precipitates in the reaction and as such, for continuous operation, the feed ratio is preferably maintained at a chloride to chlorate mole ratio 5:1 and more preferably a slight excess of chloride is employed, providing a ratio of 1:1 to 1.3:1. Therefore, it is preferred that the salt concentration in the reactor solution be maintained below the point at which the salt will crystallize from the reaction solution, but for the most rapid generation of chlorine, chloride concentration is maintained as close to the saturation point as possible. The concentration of the strong acid is also preferably maintained at above about 4 normal, and more preferably within the range of 6 to 12 normal.

The reaction temperature at which the reaction is effected may be from about 20 degrees up to the boiling point of the solution, which may be about 100 degrees centigrade or higher. Because chlorine dioxide is not particularly desired in producing chlorine by the present process, the higher reaction temperatures which tend to decompose chlorine dioxide are in many instances more desirable. The reaction is preferably effected at atmospheric or subatmospheric pressures from 50 to about 600 millimeters mercury absolute at a temperature of about 50 to about the boiling point of the solution (over 100 degrees centigrade). By carrying out the reaction at subatmospheric pressures, the reaction temperature can be lowered and the concentration of reactants within the reactor maintained at the desired level while removing the chlorine produced along with water. Under such conditions, the reduced pressure utilized is that required to effect the rapid removal of chlorine and water from the reactants.

The reaction is preferably carried out continuously by continuously adding acid, chloride and chlorate in the preferred ratios, thereby promoting the production of chlorine in comparison with that of chlorine dioxide. The mole ratio of acid to chlorate which is preferably maintained to favor the production of chlorine is about 3:1 when a neutral sulfate is recovered from the reaction solution and the residuals are recycled to the system. The concentration of the acid within the reactor can be maintained by continuously adding concentrated acids, such as 90 to 98 percent sulfuric acid, or by withdrawing an effluent liquor, crystallizing the sulfate salt therefrom, evaporating water therefrom to concentrate the acid and returning a concentrated acid material with any necessary make-up to the reactor, or by operating the reactor under reduced pressure, thereby removing water with the produced chlorine gas.

In the process, if an acid sulfate is recovered, as in a continuous reduced pressure high acid process (6–12 normal), additional acid is preferably fed to the system or reactor to make up for this loss. The reaction is faster at the higher reaction acidities and at higher operating temperatures. Further, higher concentrations of chloride and chlorate in the feed stream and thus in the reaction solution increase the reaction rate.

The present reaction can be effected either continuously, which is the preferred method, or batchwise.

The effluent liquor from a chlorine reactor may be cooled to recover the sodium sulfate salts as either sodium acid sulfate, sodium sesquisulfate, Glauber's salt, anhydrous sodium sulfate, and so forth, by suitable choice of temperature and conditions of acidity. The acid mother liquor may then be concentrated and returned to the reactor with replenishing amounts of acid and/or chloride-chlorate as solids or in aqueous solution. If sodium sulfate is crystalized in the generator as by reduced pressure reactions, or from the effluent solution in a separate operation, and if the mother liquor is returned to the generator, the concentration of chlorate and chloride in the generator may be increased to higher levels without precipitating the chloride and/or chlorate. This increases the rate of reaction and permits a lower acidity to be used. By operating at a suitably high temperature and low acidity (2 to about 4 normal) the salt crystallized from the effluent liquor may be anhydrous sodium sulfate. Under such operating conditions, in addition to the chlorine produced, sodium sulfate is also obtained.

In a further embodiment of the present invention, the small amount of chlorine dioxide simultaneously produced with the chlorine can be eliminated from the gaseous effluent by passing the effluent gases through a hot tube or other suitable reaction zone to decompose the chlorine dioxide to chlorine and oxygen. The hot zone is maintained at a temperature above about 100 degrees centigrade up to about 300 or more degrees centigrade. Thus, by the present process, chlorine free of chlorine dioxide is readily obtained. The produced chlorine may be dried, cooled and liquefied for storage, distribution or immediate use in a process as desired.

The chlorine gas from the generator can be readily cooled to condense the water vapor, and further dried by passing the cooled gas through the acid feed enroute to the generator, as by contacting the gas and acid feed in a suitable scrubbing vessel. The scrub gas may then be liquefied, if desired, by conventional processes.

The following examples compare the present invention with the normal process for chlorine dioxide generation. Unless otherwise indicated, all parts and percentages used herein are by weight and all temperatures in the examples and claims are in degrees centigrade.

Example 1

An aqueous reaction solution was fed to a chlorine dioxide generator at a rate sufficient to establish continuous reaction state conditions in which 150 cubic centimeters of reaction solution contained 0.2 molar $NaClO_3$; 0.2 molar $NaCl$; 3.3 normal $H_2SO_4$ at 70 degrees centigrade with agitation provided by the passage of 740 cubic centimeters of air per minute through the aqueous solution. The product gas was purged from the generator by the constant air flow and was scrubbed with water to remove any hydrogen chloride and the gaseous product was absorbed in potassium iodide solution. The content of chlorine and chlorine dioxide was determined by standard iodiometric analysis. The gram atom percent of chlorine dioxide produced was approximately 24.9 percent with a production rate of chlorine dioxide equal to 1.3 milligrams per minute.

Examples 2–4

The process of Example 1 was repeated with differing acids and acid normalities to produce the following results:

| Acid | N | G. A. percent $ClO_2$ | Rate (mg. $ClO_2$/min.) |
|---|---|---|---|
| $HClO_4$ | 3.3 | 35.2 | 20.6 |
| $H_2SO_4$ | 5.0 | 39.2 | 32.8 |
| $HClO_4$ | 4.7 | 40.7 | 56.5 |

Example 5

The process of Example 1 was repeated with the exception that the reaction was conducted in the presence of $H_2MoO_4$ constituting 5 grams per liter of reaction solution. The gram atom efficiency of chlorine dioxide produced fell to 4.8 percent while the reaction rate fell to 0.5 milligram of chlorine dioxide per minute.

Thus, the gaseous product contained approximately 9.05 percent by weight chlorine dioxide compared to a product containing 37 percent by weight chlorine dioxide for the process of Example 1. This represents a conversion of $NaClO_3$ to $Cl_2$ of about 90 percent under otherwise normal chlorine dioxide generator conditions.

Example 6

To a chlorine dioxide generator there is fed sodium chlorate, sodium chloride and an aqueous solution of fifty percent sulfuric acid at a rate such that the average concentrations of the chlorate and chloride in the generator are about 0.98 and 0.80 molar, respectively and the average normality of the sulfuric acid was 3.8. The generator is operated at 78 degrees under a pressure of 200 millimeters of mercury, absolute. Silver nitrate was added to the reaction solution in an amount sufficient to provide between 0.0057 to 1.114 grams $AgNO_3$ per liter. Chlorine dioxide was continuously generated for a period of time sufficient to demonstrate an efficiency of 43 gram atom percent chlorine dioxide, at which time the silver was purged from the reaction solution and 0.15 mole percent $MoO_3$ was introduced into the reaction solution, based upon the molarity of the sodium chlorate. The mole ratio of sodium chlorate to sodium chloride was maintained as prescribed for chlorine dioxide generation, as were the temperature, pressure and average acid normality. The gaseous product contained chlorine in about 90 percent conversion based upon the sodium chlorate reacting, as opposed to an approximate 10 percent conversion to chlorine under the chlorine dioxide generating conditions in the absence of the molybdic acid catalyst.

By addition of $H_2MoO_3$ to the reaction solution in amounts sufficient to provide from about 0.01 to about 0.5 molar solution, the catalysis of chlorine production is effected. The molybdic acid concentration may be in the range of 5 to 40 mole percent $MoO_3$ based upon the $NaClO_3$ molarity and preferably from about 10 to about 20 mole percent $MoO_3$.

What is claimed is:

1. A process for the chemical production of substantially pure chlorine which comprises reacting an alkali metal chlorate with an alkali metal chloride in aqueous solution from about 2 to about 12 normal in at least one acid selected from the group consisting of hydrochloric acid, sulfuric acid, phosphoric acid, chloric acid and perchloric acid, in the presence of a catalytic amount hexavalent molybdenum.

2. The process of claim 1 in which the concentration of alkali metal chloride in said aqueous solution is in excess of the alkali metal chlorate concentration, and is between 0.5 to about 3.5 moles per liter.

3. The process of claim 1 in which the chloride to chlorate ratio is between 1:1 to about 1.3:1.

4. The process of claim 1 in which the temperature of reaction is from 65 to about 100 degrees centigrade.

5. The process of claim 1 in which the pressure is from 50 millimeters mercury absolute to atmospheric pressure.

6. The process of claim 1 in which the concentration of hexavalent molybdenum is about 0.01 to about 10 grams per liter of solution.

7. The process of claim 1 in which the gaseous reaction product is passed through an elevated temperature zone at from between 100 to about 300 degrees centigrade to convert any chlorine dioxide to chlorine and oxygen.

8. A process for the production of substantially pure chlorine which comprises
  (a) continuously introducing an aqueous solution of alkali metal chlorate and alkali metal chloride in molar ratio of chloride to chlorate between 1:1 to about 1.3:1 into a reaction vessel
  (b) continuously introducing an acid selected from the group consisting of hydrochloric acid, sulfuric acid, phosphoric acid, chloric acid and perchloric acid into said reaction vessel in an amount sufficient to obtain an average acidity of from about 2–12 normal, while
  (c) maintaining the temperature and pressure of the reaction solution in said reaction vessel between 65 to about 95 degrees centigrade and between about 50 to about 700 millimeters mercury absolute, said temperature and pressure being coordinated to generate water vapor to maintain a substantially constant volume of reaction solution in said vessel
  (d) continuously reacting said alkali metal chlorate, alkali metal chloride and said acid in the presence of a catalytic amount of hexavalent molybdenum
  (e) withdrawing from said reaction vessel the chlorine produced in admixture with water vapor and chlorine dioxide, while
  (f) continuously forming in said reaction solution the solid alkali metal salt of said acid, and
  (g) removing from said reaction vessel said solid salt.

9. The process of claim 8 in which the concentration of hexavalent molybdenum in said reaction solution is from 0.01 to about 10 grams per liter.

10. The process of claim 8 in which said acid is sulfuric acid.

11. A composition of matter consisting essentially of an alkali metal chlorate, an alkali metal chloride and molybdenum trioxide in molar ratio of about 1:1–1.1:0.05–0.40.

12. The composition of claim 11 in which the molar ratio is about 1:1:0.1–0.2.

References Cited
UNITED STATES PATENTS 3,563,702  2/1971  Partridge et al. ____ 23—219 X OSCAR R. VERTIZ, Primary Examiner G. ALVARO, Assistant Examiner U.S. Cl. X.R.

23—152